(12) United States Patent
Habu et al.

(10) Patent No.: US 12,476,320 B2
(45) Date of Patent: Nov. 18, 2025

(54) BATTERY PACK, VEHICLE EQUIPPED WITH BATTERY PACK, AND REPLACEMENT METHOD OF BATTERY BLOCKS IN BATTERY PACK

(71) Applicant: TOYOTA JIDOSHA KABUSHIKI KAISHA, Toyota (JP)

(72) Inventors: Masakazu Habu, Toyota (JP); Koichi Ichikawa, Kasugai (JP); Juni Yasoshima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 678 days.

(21) Appl. No.: 17/862,759

(22) Filed: Jul. 12, 2022

(65) Prior Publication Data

US 2023/0033847 A1 Feb. 2, 2023

(30) Foreign Application Priority Data

Jul. 27, 2021 (JP) .................. 2021-122622

(51) Int. Cl.
*H01M 50/269* (2021.01)
*G01R 31/3842* (2019.01)
*G01R 31/396* (2019.01)
*H01M 10/42* (2006.01)
*H01M 50/204* (2021.01)
*H01M 50/249* (2021.01)

(52) U.S. Cl.
CPC ..... *H01M 50/269* (2021.01); *H01M 10/4207* (2013.01); *H01M 10/425* (2013.01); *H01M 50/204* (2021.01); *H01M 50/249* (2021.01); *G01R 31/3842* (2019.01); *G01R 31/396* (2019.01); *H01M 2220/20* (2013.01)

(58) Field of Classification Search
None
See application file for complete search history.

(56) References Cited

U.S. PATENT DOCUMENTS

2001/0035737 A1   11/2001   Nakanishi et al.
2003/0090239 A1*  5/2003    Sakakibara ............ H02J 50/80
                                                320/166
2003/0224241 A1   12/2003   Takada et al.
(Continued)

FOREIGN PATENT DOCUMENTS

JP   2002-015781 A   1/2002
JP   2003-109670 A   4/2003
(Continued)

OTHER PUBLICATIONS

Machine Translation of JP 2003109670A. (Year: 2003).*

Primary Examiner — Gregg Cantelmo
(74) Attorney, Agent, or Firm — Oliff PLC

(57) ABSTRACT

A battery pack according to the present disclosure includes a plurality of battery blocks, the battery blocks being arrayed adjacent to each other in a stacking direction that is set in advance. After two or more of the battery blocks are replaced with multiple replacement battery blocks that have been refreshed in advance, multiple non-replacement battery blocks, among the battery blocks, that have not been replaced with the replacement battery blocks, are adjacent to each other in the stacking direction, and the replacement battery blocks are adjacent to each other in the stacking direction.

7 Claims, 5 Drawing Sheets

(56) References Cited

U.S. PATENT DOCUMENTS

2009/0239137 A1* 9/2009 Kakuchi ............. H01M 50/271
429/151
2010/0259104 A1* 10/2010 Winkelman ...... H01M 10/4207
307/77

FOREIGN PATENT DOCUMENTS

| | | |
|---|---|---|
| JP | 2003-346909 A | 12/2003 |
| JP | 4457626 B2 | 4/2010 |
| JP | 4956881 B2 | 6/2012 |
| JP | 2014-011060 A | 1/2014 |

* cited by examiner

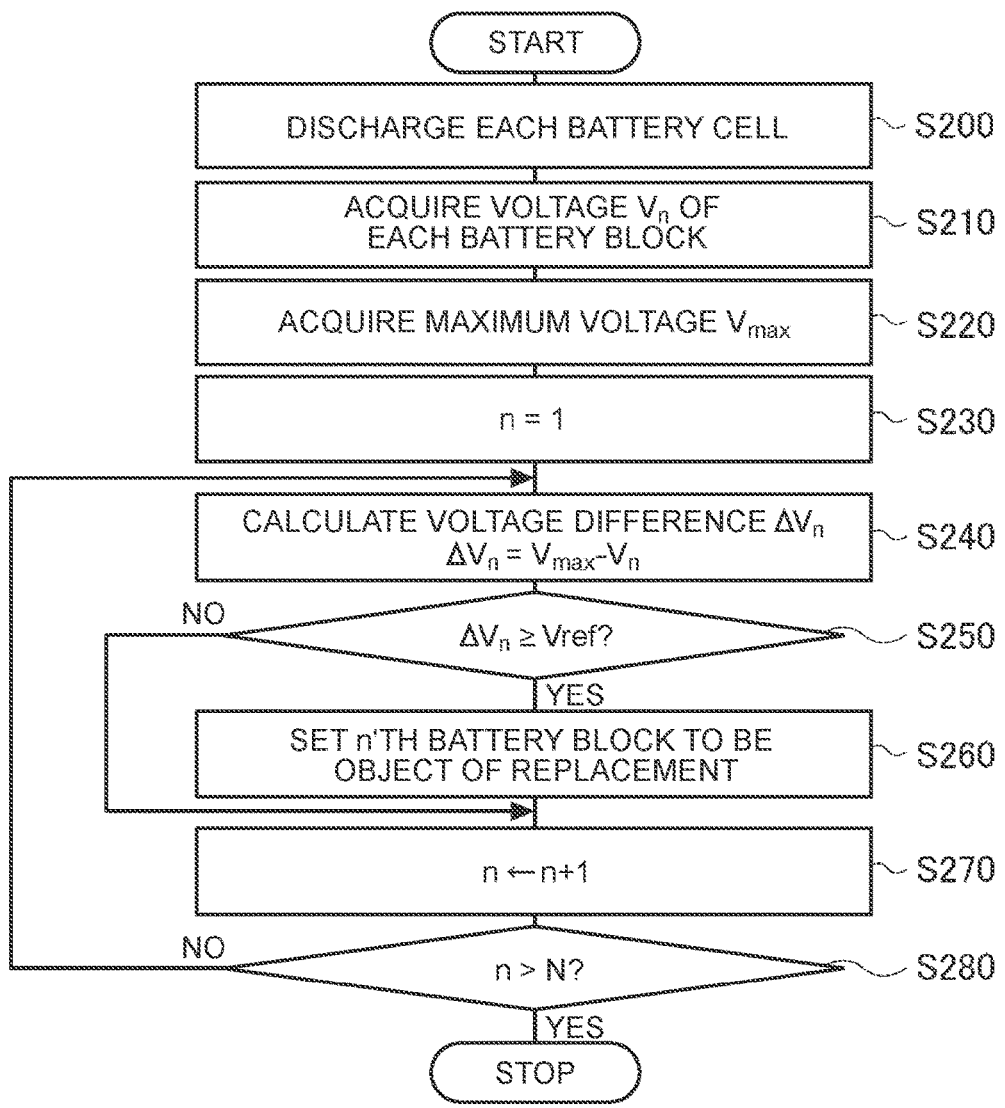
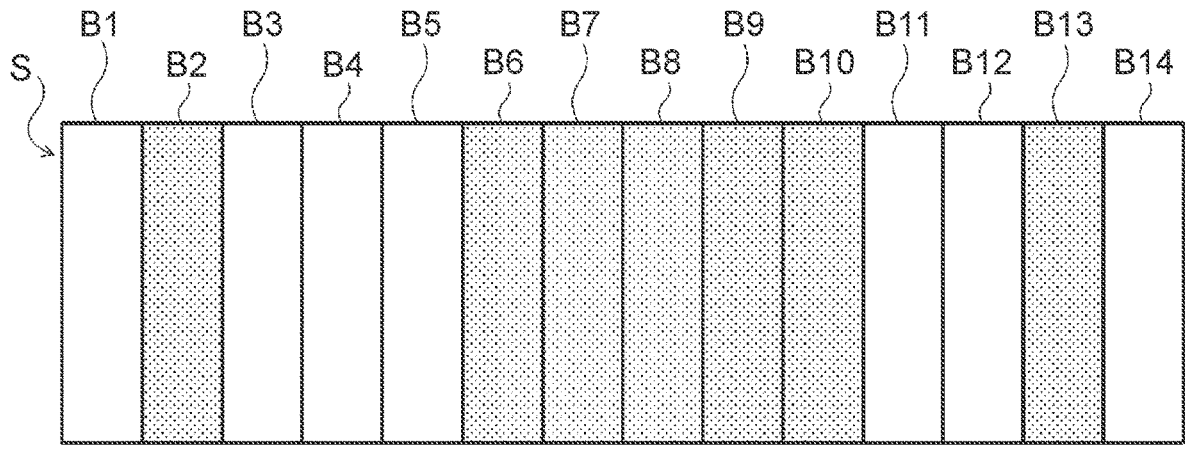

BATTERY PACK, VEHICLE EQUIPPED WITH BATTERY PACK, AND REPLACEMENT METHOD OF BATTERY BLOCKS IN BATTERY PACK

CROSS-REFERENCE TO RELATED APPLICATION

This application claims priority to Japanese Patent Application No. 2021-122622 filed on Jul. 27, 2021, incorporated herein by reference in its entirety.

BACKGROUND

1. Technical Field

The present disclosure relates to a battery pack including multiple battery blocks arrayed adjacent to each other in a predetermined stacking direction, a vehicle equipped with the battery pack, and a replacement method of the battery blocks in the battery pack.

2. Description of Related Art

Assembled batteries are known that are configured with a plurality of battery modules electrically connected in series or in parallel, the battery modules including a plurality of cells. Each battery module can be replaced with a replacement battery module (e.g., see Japanese Unexamined Patent Application Publication No. 2003-346909 (JP 2003-346909 A)). In this assembled battery, when the battery module that is an object of replacement is replaced with a replacement battery module, for example, at least one procedure is performed of cycle charge-discharge of the replacement battery module with change width of the state of charge (SOC) limited to an intermediate range, and letting stand for a predetermined amount of time in an environment of which the temperature is higher than room temperature following setting the initial SOC. Thus, a memory effect is imparted to the replacement battery module, and accordingly difference in voltage characteristics between a non-replacement battery module with a history of use and the replacement battery module in an unused state is resolved, and the voltage characteristics are made uniform for the assembled battery as a whole.

SUMMARY

However, when imparting the memory effect to the replacement battery module in advance, the replacement work of the battery module becomes complicated due to the addition of the process of imparting the memory effect, which may lead to an increase in costs. On the other hand, when the battery module that is an object of replacement is replaced with a replacement battery module to which the memory effect is not imparted in advance, voltage difference between the replacement battery module and an adjacent non-replacement battery module due to having and not having the memory effect becomes great when the state of charge (SOC) is low, and determination may be erroneously made that the battery module needs to be replaced again, immediately after replacing the battery module.

Accordingly, the present disclosure provides a battery pack, a vehicle equipped with the battery pack and a replacement method of the battery blocks in the battery pack that suppresses erroneous determination that the battery block needs to be replaced again at a relatively early timing after the replacement of the battery block, while suppressing complication and increase in costs of replacement work of a battery block included in the battery pack.

The battery pack according to a first aspect of the present disclosure is a battery pack including a plurality of battery blocks, the battery blocks being arrayed adjacent to each other in a stacking direction that is set in advance. After two or more of the battery blocks are replaced with multiple replacement battery blocks that have been refreshed in advance, multiple non-replacement battery blocks, among the battery blocks, that have not been replaced with the replacement battery blocks, are adjacent to each other in the stacking direction, and the replacement battery blocks are adjacent to each other in the stacking direction.

In the battery pack according to the first aspect of the present disclosure, when two or more of the battery blocks should be replaced, the two or more of the battery blocks are replaced with replacement battery blocks that have been refreshed in advance. That is to say, when battery blocks in the battery pack according to the first aspect of the present disclosure are replaced, the memory effect is not imparted to the replacement battery blocks, and work complication and increase in costs can be suppressed by omitting the process of imparting the memory effect. Also, in the battery pack according to the first aspect of the present disclosure, after the battery blocks that are the object of replacement are replaced with the replacement battery blocks, the multiple non-replacement battery blocks in which the memory effect is occurring are appropriately rearranged to be adjacent to each other in the stacking direction, and the replacement battery blocks in which substantially no memory effect is occurring are adjacent to each other in the stacking direction. Accordingly, multiple battery blocks having a similar amount of voltage drop due to the memory effect are grouped together, and thus, a situation in which the voltage difference between two adjacent battery blocks becomes great due to the voltage drop resulting from the memory effect after the replacement of the battery blocks can be satisfactorily suppressed, and whether the battery blocks need to be replaced can be determined with good precision based on the voltage difference. As a result, in the battery pack according to the first aspect of the present disclosure, a situation in which the battery blocks are erroneously determined to need to be replaced again at a relatively early timing after the replacement thereof can be suppressed, while suppressing complication and increase in costs of replacement work of the battery blocks. Note that the battery blocks of the battery pack according to the first aspect of the present disclosure may each be a battery module including a plurality of battery cells, or may include a plurality of the battery modules, or may be a single battery cell.

Also, after two or more of the battery blocks are replaced with the replacement battery blocks, the non-replacement battery blocks may be adjacent to each other in the stacking direction on both a first end portion side and a second end portion side in the stacking direction, and the replacement battery blocks may be adjacent to each other in the stacking direction between the non-replacement battery blocks on the first end portion side and the non-replacement battery blocks on the second end portion side. In a middle region in the stacking direction of the battery blocks, the temperature of the battery blocks is generally constant at a relatively high temperature, whereas at the first end portion side and the second end portion side of the battery blocks in the stacking direction at which the heat dissipation is high, the temperature of the battery blocks gradually decreases from the middle side toward the ends. Further, when temperature difference occurs between two adjacent battery blocks, voltage difference occurs between the two battery blocks due to the temperature difference. Accordingly, when non-replacement battery blocks and replacement battery blocks are adjacent to each other on the first end portion side and the second end portion side of the battery blocks, the voltage difference between the two may become great due to the difference in having and not having the memory effect, and the temperature difference. Taking this into consideration, in the battery pack according to the first aspect of the present disclosure, the non-replacement battery blocks in which the memory effect has occurred may be arrayed on both the first end portion side and the second end portion side of the battery blocks, and the replacement battery blocks may be arrayed between the non-replacement battery blocks on the first end portion side and the non-replacement battery blocks on the second end portion side. Accordingly, the factors causing the voltage difference to occur between the two adjacent non-replacement battery blocks are substantially reduced to just the temperature difference between the two, thereby satisfactorily suppressing the voltage difference from becoming great, and also non-replacement battery blocks and replacement battery blocks are placed adjacently in a region where the temperature change is small and voltage difference between the two can be satisfactorily suppressed from becoming great.

Further, among the non-replacement battery blocks, the non-replacement battery blocks that are closer to a first end portion than to a second end portion in the stacking direction may be arrayed being collected to the first end portion, and the non-replacement battery blocks that are closer to the second end portion than to the first end portion may be arrayed being collected to the second end portion. Accordingly, after two or more of the battery blocks are replaced with the replacement battery blocks, the non-replacement battery blocks are placed at or near the positions of original placement of the battery blocks, and accordingly, the voltage drop amounts of the non-replacement battery blocks due to the memory effect can be made even closer to each other at each of the first end portion side and the second end portion side of the battery blocks.

Further, the battery pack may be configured to be installed in a vehicle, and the vehicle may include an electric motor configured to exchange electric power with the battery pack, and a control device configured to issue a warning when a voltage difference between two of the battery blocks adjacent to each other is not less than a threshold value that is set in advance. Accordingly, a user of the vehicle can be appropriately and promptly notified that some of the battery blocks of the battery pack should be replaced.

Further, a voltage difference between each of voltages of the battery blocks to be replaced with the replacement battery blocks and a maximum voltage among voltages of the battery blocks may not be less than a replacement threshold value that is set in advance. Thus, the battery blocks that should be replaced can be identified more appropriately.

Also, each of the battery blocks may include a plurality of nickel metal hydride battery cells and each of the replacement battery blocks may include a plurality of nickel metal hydride battery cells. However, the battery blocks and the replacement battery blocks are not limited to those including nickel metal hydride battery cells, and may include battery cells that are other than the nickel metal hydride battery cells and in which the memory effect occurs.

A vehicle according to a second aspect of the present disclosure may be equipped with the battery pack, and may include an electric motor configured to exchange electric power with the battery pack, and a control device configured to issue a warning when a voltage difference between two of the battery blocks adjacent to each other is not less than a threshold value that is set in advance. Accordingly, a user of the vehicle can be appropriately and promptly notified that some of the battery blocks of the battery pack should be replaced.

A replacement method according to a third aspect of the present disclosure is a replacement method of two or more of battery blocks in a battery pack including the battery blocks arrayed adjacent to each other in a stacking direction that is set in advance. The replacement method includes replacing two or more of the battery blocks with multiple replacement battery blocks that have been refreshed in advance, such that, among the battery blocks, multiple non-replacement battery blocks that have not been replaced with the replacement battery blocks are arrayed adjacent to each other in the stacking direction, and the replacement battery blocks are arrayed adjacent to each other in the stacking direction.

According to this method, a situation in which the battery blocks are erroneously determined to need to be replaced again at a relatively early timing after the replacement can be suppressed, while suppressing complication and increase in costs of replacement work of the battery blocks.

Also, in the replacement method according to the third aspect of the present disclosure, after two or more of the battery blocks are replaced with the replacement battery blocks, the non-replacement battery blocks and the replacement battery blocks may be arrayed such that the non-replacement battery blocks are adjacent to each other in the stacking direction on both a first end portion side and a second end portion side in the stacking direction, and the replacement battery blocks are adjacent to each other in the stacking direction between the non-replacement battery blocks on the first end portion side and the non-replacement battery blocks on the second end portion side. Accordingly, the factors causing the voltage difference to occur between the two adjacent non-replacement battery blocks are substantially reduced to just the temperature difference between the two, thereby satisfactorily suppressing the voltage difference from becoming great, and also non-replacement battery blocks and replacement battery blocks are placed adjacently in a region where the temperature change is small and voltage difference between the two can be satisfactorily suppressed from becoming great.

In the replacement method according to the third aspect of the present disclosure, among the non-replacement battery blocks, the non-replacement battery blocks that are closer to a first end portion than to a second end portion in the stacking direction may be arrayed being collected to the first end portion, and the non-replacement battery blocks that are closer to the second end portion than to the first end portion may be arrayed being collected to the second end portion. Accordingly, after two or more of the battery blocks are replaced with the replacement battery blocks, the non-replacement battery blocks are placed at or near the positions of original placement of the battery blocks, and thus, the voltage drop amounts of the non-replacement battery blocks due to the memory effect can be made even closer to each other at each of the first end portion side and the second end portion side of the battery blocks.

In the replacement method according to the third aspect of the present disclosure, the battery pack may be configured to be installed in a vehicle, and the vehicle may include an electric motor configured to exchange electric power with the battery pack, and a control device configured to issue a warning when a voltage difference between two of the battery blocks adjacent to each other is not less than a threshold value that is set in advance. Accordingly, a user of the vehicle can be appropriately and promptly notified that some of the battery blocks of the battery pack should be replaced.

In the replacement method according to the third aspect of the present disclosure, a voltage difference between each of voltages of the battery blocks to be replaced with the replacement battery blocks and a maximum voltage among voltages of the battery blocks, may not be less than a replacement threshold value that is set in advance. Thus, the battery blocks that should be replaced can be identified more appropriately.

In the replacement method according to the third aspect of the present disclosure, each of the battery blocks may include a plurality of nickel metal hydride battery cells and each of the replacement battery blocks may include a plurality of nickel metal hydride battery cells. However, the battery blocks and the replacement battery blocks are not limited to those including nickel metal hydride battery cells, and may include battery cells that are other than the nickel metal hydride battery cell and in which the memory effect occurs.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a flowchart exemplarily showing a routine executed to identify a battery block that is an object of replacement in the battery pack according to the present disclosure;

FIG. 5 is a schematic diagram for describing procedures for replacing a battery block in the battery pack according to the present disclosure;

DETAILED DESCRIPTION OF EMBODIMENTS

An embodiment for carrying out the present disclosure will be described with reference to the drawings.

Figure 1:
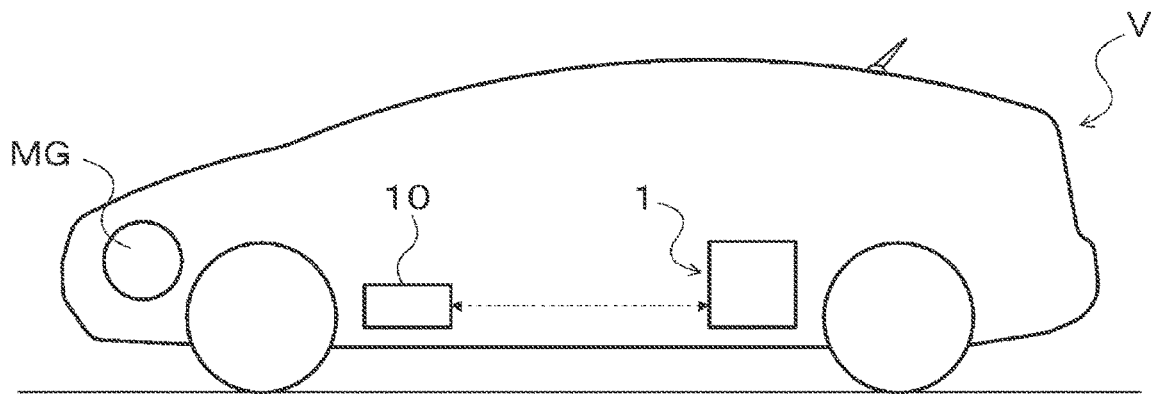
FIG. 1 is a schematic configuration diagram illustrating a vehicle equipped with a battery pack according to the present disclosure.

FIG. 1 is a schematic configuration diagram illustrating a vehicle V equipped with a battery pack 1 according to the present disclosure. The vehicle V illustrated in FIG. 1 is an battery electric vehicle (BEV) or a hybrid electric vehicle (hybrid electric vehicle (HEV) or plug-in hybrid electric vehicle (PHEV)) including, in addition to the battery pack 1, a motor generator (three-phase alternating current electric motor) MG that is connected to the battery pack 1 via power control devices (omitted from illustration) including an inverter and so forth, and that is capable of exchanging electric power with the battery pack 1 to output drive power for traveling and regenerative braking force. In the present embodiment, electric power from the battery pack 1 is supplied to a compressor or the like of an air conditioner provided in the vehicle V, and is also able to be supplied to auxiliary equipment such as headlights via a direct current (DC)-DC converter that is omitted from illustration. Further, the vehicle V includes an electronic control unit 10 (hereinafter, referred to as "ECU 10") that manages the battery pack 1.

Figure 2:
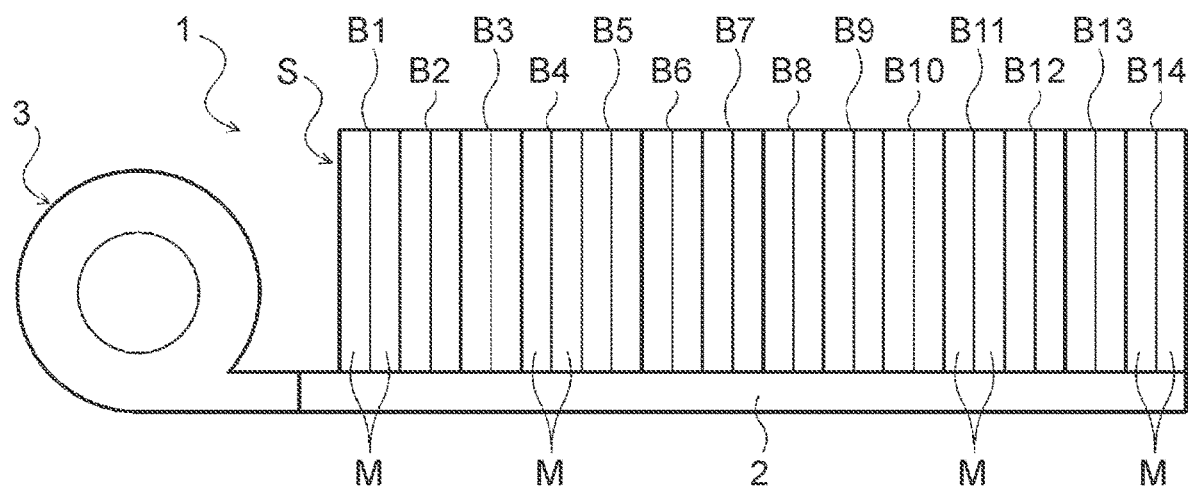
FIG. 2 is a schematic configuration diagram illustrating the battery pack according to the present disclosure.

As illustrated in FIG. 2, the battery pack 1 includes multiple (e.g., 28 in the present embodiment) battery modules M connected in series, for example, a base member 2, and a blower 3. Each battery module M includes a module case that is relatively flat and substantially cuboid, and multiple (e.g., six in the present embodiment) battery cells (unit cells), which are omitted from illustration, connected in series, for example, and housed in the module case. Also, each battery cell included in the battery module M is a nickel metal hydride secondary battery.

The battery modules M are arrayed (stacked) so as to be adjacent to each other in a predetermined stacking direction (a right-left direction in FIG. 2) and are integrated with each other to form a battery stack S. In the present embodiment, the stacking direction of the battery modules M matches a thickness direction (the direction in which the shortest side extends) of the module case. The battery modules M (i.e., the battery stack S) are mounted and fixed upon the base member 2, and are covered with a cover (omitted from illustration) that is fixed to the base member 2.

Also, in the battery pack 1, two battery modules M adjacent to each other form one battery block B1, B2, . . . , B13, or B14, as illustrated in FIG. 2. That is to say, the battery pack 1 includes multiple (e.g., 14 in the present embodiment) battery blocks B1 to B14 arrayed so as to be adjacent to each other in the stacking direction. When the performance of any of the battery blocks B1 to B14 declines due to deterioration or the like in the battery pack 1, the battery blocks B1 to B14 that are an object of replacement can be individually replaced. Note that in the following description, the battery blocks B1 to B14 will be collectively referred to as "battery blocks B" as appropriate.

The base member 2 of the battery pack 1 has an air supply passage (omitted from illustration) that opens at one end side of the base member 2, and a discharge port of the blower 3 is connected to the opening portion of the air supply passage. The blower 3 is a sirocco fan driven by a brushless motor, for example, and is fixed to the base member 2 so as to face one end of the battery stack S (battery block B1) with a spacing therebetween, as illustrated in FIG. 2. The blower 3 sends air, taken in through an intake duct that is omitted from illustration, through the discharge port and into the air supply passage of the base member 2.

Further, the battery stack S has a plurality of air passages each communicating with the air supply passage of the base member 2 and communicating with an exhaust duct that is omitted from illustration. In the present embodiment, each air passage is formed between two adjacent battery modules M. Accordingly, the air from the blower 3 is supplied to the air passages through the air supply passage of the base member 2, and the air flowing into each air passage draws heat away from the battery modules M on both sides and is externally discharged from the exhaust duct that is omitted from illustration. Note that a junction box or the like, omitted from illustration, is placed between the battery stack S (battery block B1) and the blower 3.

In the vehicle V equipped with the battery pack 1 such as described above, a routine shown in FIG. 3 is repeatedly executed by the ECU 10 while the vehicle V is system-activated, in order to determine whether the battery blocks B1 to B14 need to be replaced. When the execution timing of the routine of FIG. 3 arrives, the ECU 10 acquires a voltage (inter-block voltage) $V_n$ (in which "n" is the No. of the battery block B, and n=1, 2, . . . , 14 in the present embodiment) of each of the battery blocks B1 to B14 detected by a voltage sensor that is omitted from illustration (step S100). Next, the ECU 10 sets a variable n, i.e., the No. of the battery blocks B included in the battery pack 1 to the value 1 (step S110). Further, the ECU 10 calculates a voltage difference $dV_n (=V_{n+1}-V_n)$ between the battery block $B_n$ and the battery block $B_{n+1}$, from the voltage $V_n$ of the battery block $B_n$ and the voltage $V_{n+1}$ of the battery block $B_{n+1}$ acquired in step S100 (step S120), and determines whether an absolute value of the voltage difference $dV_n$ is not less than a threshold value (positive value) dVref that is set in advance (step S130).

When determination is made that the absolute value of the voltage difference $dV_n$ is not less than the threshold value dVref (YES in step S130), the ECU 10 increments a counter C (step S140), and thereafter determines whether the counter C is not less than a threshold value Cref (an integer 2 or greater) that is set in advance (step S150). When the counter C is not less than the threshold value Cref (YES in step S150), the voltage difference $dV_n$ between the battery block $B_n$ and the battery block $B_{n+1}$ is continuously not less than the threshold value dVref, and accordingly the ECU 10 deems that the battery block $B_n$ or the battery block $B_{n+1}$ of which the voltage $V_n$ or $V_{n+1}$ is smaller should be replaced, and the No. n or n+1 thereof is stored in a storage device that is omitted from illustration (step S160). Further, the ECU 10 lights a warning light that is omitted from illustration, provided on an instrument panel that is also omitted from illustration, in the vehicle V, in order to notify a user of the vehicle V that there is a battery block B that should be replaced (step S170).

Figure 3:
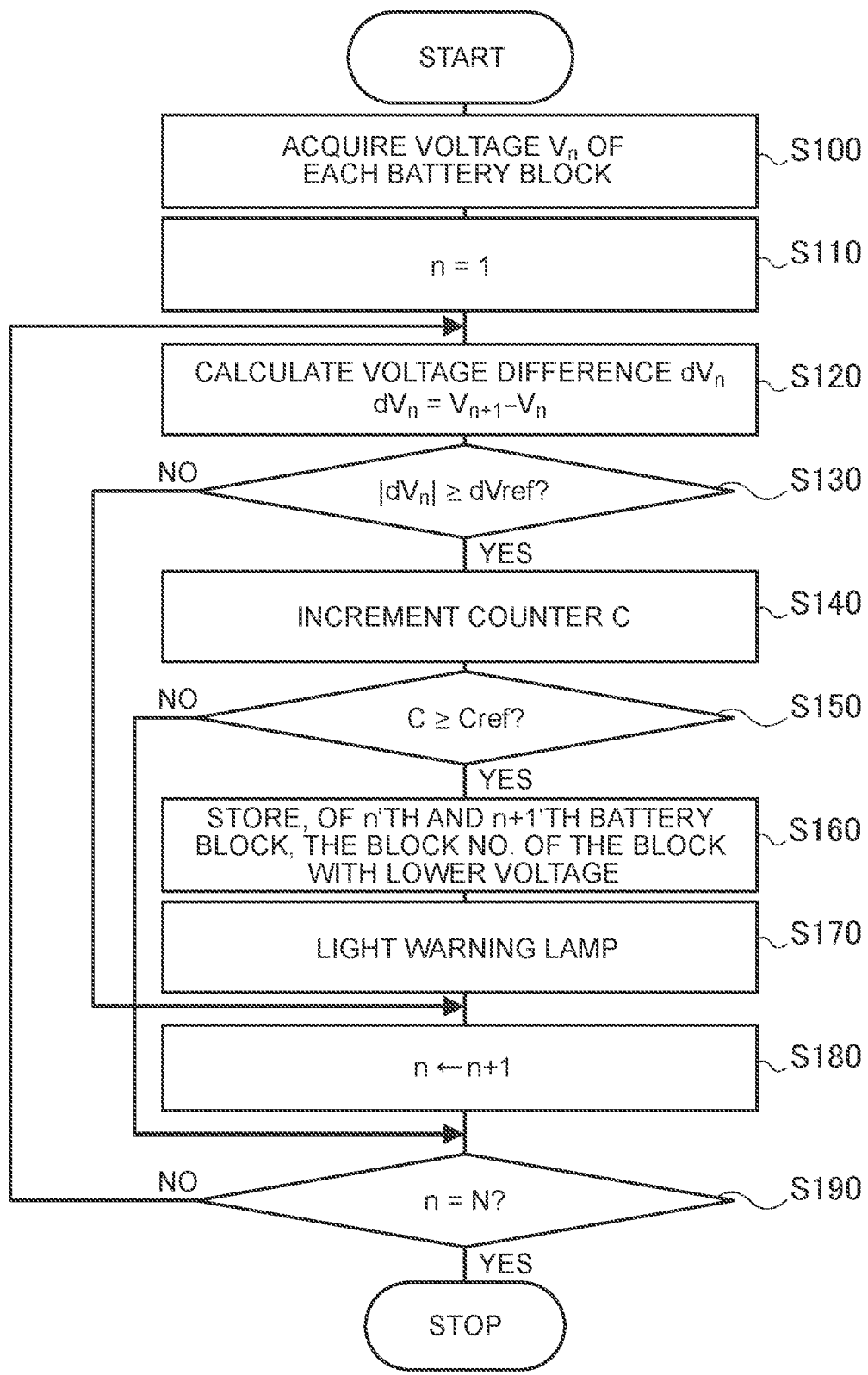
FIG. 3 is a flowchart exemplarily showing a routine executed by a control device of the vehicle illustrated in FIG. 1 to determine necessity of replacement of a battery block included in the battery pack according to the present disclosure.

Also, when the ECU 10 determines that the absolute value of the voltage difference $dV_n$ is less than the threshold value dVref (NO in step S130), the processing of steps S140 to S170 is skipped, and when determining that the counter C is less than the threshold value Cref (NO in step S150), the processing of steps S160 to 180 is skipped. After performing the processing of steps S130, S150 or S170, the ECU 10 increments the variable n (step S180), and determines whether the variable n is equal to the total number N of the battery blocks B1 to B14 (e.g., 14 in the present embodiment) in the battery pack 1 (step S190). When determining that the variable n is not equal to the total number N (NO in step S190), the ECU 10 repeatedly executes the processing of step S120 and thereafter described above, and at the point that the variable n is equal to the total number N (YES in step S190), the routine shown in FIG. 3 is ended for the time being. By executing the routine of FIG. 3, the user of the vehicle V can be appropriately and promptly notified that some of the battery blocks B of the battery pack 1 should be replaced.

Next, procedures for replacing the battery blocks B in the battery pack 1 will be described with reference to FIGS. 4 to 9. FIG. 4 is a flowchart exemplarily showing a routine executed for identifying battery blocks B that are an object of replacement, from among the battery blocks B1 to B14 of the battery pack 1. The routine shown in FIG. 4 is executed by a diagnostic device (computer) connected to the vehicle V at a dealer, a service garage, or the like, to which the vehicle V is brought in.

At the start of the routine shown in FIG. 4, the diagnostic device first discharges each battery cell of the battery pack 1, by operating the air conditioner (omitted from illustration) of the vehicle V, and also turning on headlights, or the like (step S200). The discharging processing in step S200 is executed until an amount of time that is set in advance elapses after the SOC of one of the battery cells declines to a value set in advance. After the discharging processing is completed, the diagnostic device acquires each voltage (inter-block voltage) $V_n$ of the battery blocks B1 to B14 detected by the voltage sensor that is omitted from illustration (step S210). Further, the diagnostic device acquires a maximum voltage $V_{max}$, which is the maximum value among the voltages $V_1, V_2, \ldots, V_{14}$ acquired in step S210 (step S220).

Next, the diagnostic device sets the variable n (the No. of the battery blocks B) to the value 1 (step S230). Further, the diagnostic device calculates a voltage difference $\Delta V_n$ ($=V_{max}-V_n$) between the voltage $V_n$ of the battery block $B_n$ acquired in step S210 and the maximum voltage $V_{max}$ (step S240), and determines whether the voltage difference $\Delta V_n$ is not less than a replacement threshold value Vref (positive value) that is set in advance (step S250). When determining that the voltage difference $\Delta V_n$ is not less than the replacement threshold value Vref (YES in step S250), the diagnostic device deems that the voltage $V_n$ of the battery block $B_n$ has significantly declined due to deterioration or the like, and identifies this battery block $B_n$ as being an object of replacement (step S260). Also, when determining that the voltage difference $\Delta V_n$ is less than the replacement threshold value Vref (NO in step S250), the ECU 10 skips the processing of step S260.

After performing the processing of steps S250 or S260, the ECU 10 increments the variable n (step S270), and determines whether the variable n has exceeded the total number N of the battery blocks B1 to B14 in the battery pack 1 (step S280). When determining that the variable n is not greater than the total number N (NO in step S280), the ECU 10 repeatedly executes the processing of step S240 and thereafter described above, and at the point that the variable n exceeds the total number N (YES in step S280), the routine shown in FIG. 4 is ended. By executing the routine shown in FIG. 4, battery blocks B that should be replaced can be identified more appropriately.

Figure 9:
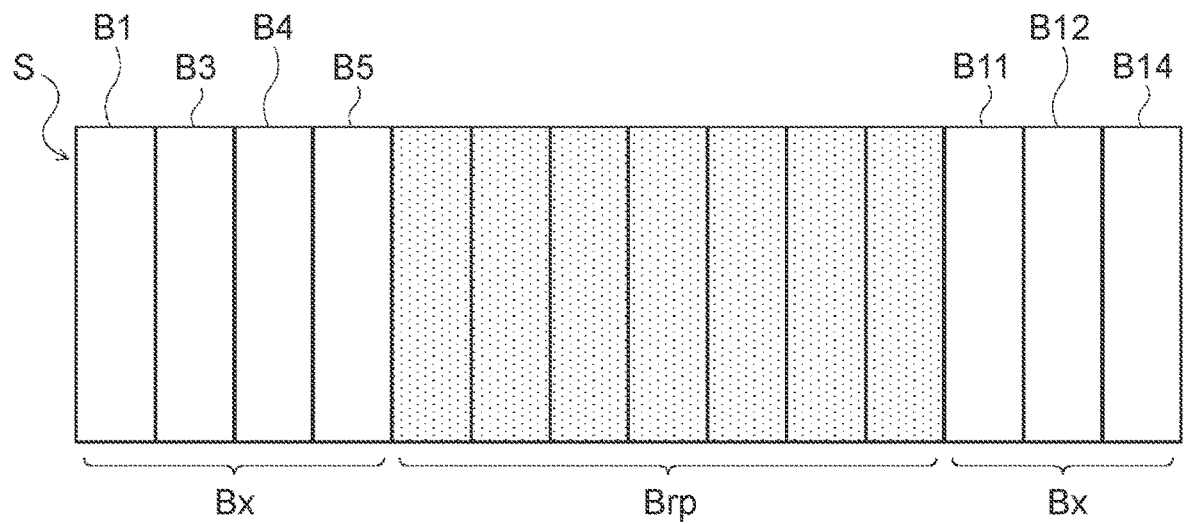
FIG. 9 is a schematic diagram for describing procedures for replacing battery blocks in the battery pack according to the present disclosure.

When battery blocks B that are the object of replacement are identified by executing the routine shown in FIG. 4, the battery pack 1 is removed from the vehicle V, and the battery blocks B that are the object of replacement are replaced with replacement battery blocks Brp (see FIG. 9). As illustrated in FIG. 5, when the battery blocks B2, B6 to B10, and B13 are identified as being the object of replacement (see shaded portions in the FIG. 5), for example, these battery blocks B2, B6 to B10, and B13 are removed from the battery pack 1 to be replaced by the replacement battery blocks Brp, following the battery pack 1 being removed from the vehicle V. In the present embodiment, the replacement battery blocks Brp have been refreshed by being discharged to the final voltage in advance and then charged, and as indicated by the continuous line in FIG. 6, the memory effect substantially does not occur. That is to say, when the battery blocks B in the battery pack 1 are replaced, the memory effect is not imparted to the replacement battery blocks Brp.

Figure 6:
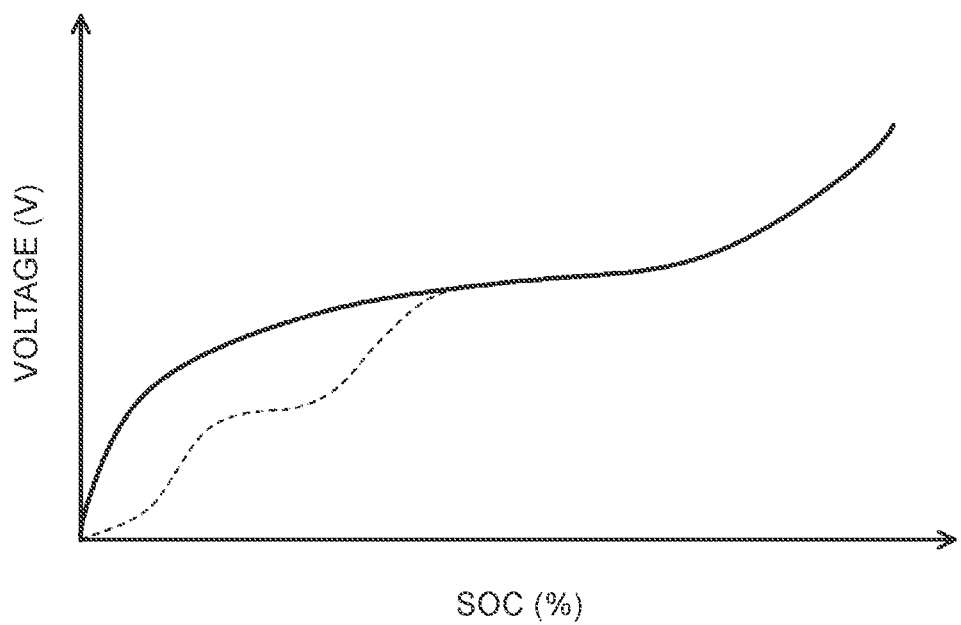
FIG. 6 is an explanatory diagram showing voltage characteristics of a non-replacement battery block and a replacement battery block in the battery pack according to the present disclosure.
Figure 7:
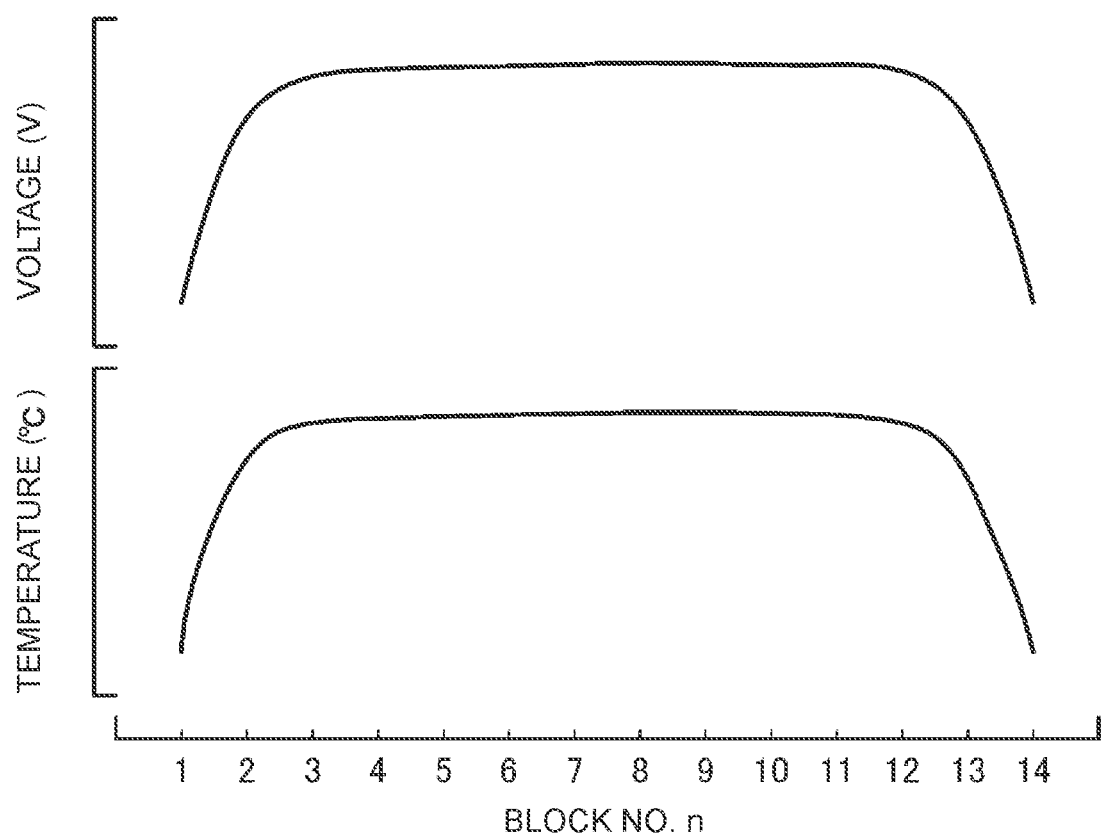
FIG. 7 is an explanatory diagram showing temperatures and voltages of a plurality of battery blocks of the battery pack according to the present disclosure.

Here, the non-replacement battery blocks B1, B3 to B5, B11, B12, and B14 (hereinafter, referred to as "non-replacement battery blocks Bx" as appropriate, see FIG. 9), which are battery blocks B in FIG. 5 that are not the object of replacement, exhibit the memory effect occurring as indicated by the dashed line in FIG. 6, and when the SOC declines without being refreshed, the voltage declines during discharging due to the memory effect. Further, as shown in FIG. 7, the temperature of the stacked battery blocks B1 to B14, i.e., the battery blocks B3 to B12 arrayed in a middle region of the battery stack S, becomes generally constant at a relatively high temperature. On the other hand, the heat dissipation is higher at both end portions of the battery stack S than at the middle thereof, and accordingly the temperature of the battery blocks B gradually decreases from a middle side toward the battery block B1 on the one end side, and also the temperature gradually decreases from a middle side toward the battery block B14 on the other end side, as shown in FIG. 7. As a result, at both end portions of the battery stack S, temperature difference occurs between two adjacent battery blocks $B_n$ and $B_{n+1}$ (between B1 and B2, between B2 and B3, between B12 and B13, and between B13 and B14), and voltage difference occurs between these two battery blocks $B_n$ and $B_{n+1}$ due to the temperature difference, as shown in FIG. 7.

Accordingly, when the battery blocks B2 and B13 become the object of replacement and the battery blocks B2 and B13 are replaced with the replacement battery blocks Brp as exemplarily illustrated in FIG. 5, the replacement battery block Brp will be adjacent to the non-replacement battery blocks B1 and B3 at one end side of the battery stack S in which the above temperature difference occurs, and the replacement battery block Brp will be adjacent to the non-replacement battery blocks B12 and B14 at the other end side. In this case, due to both the difference in having and not having the memory effect and the temperature difference, the voltage difference between the replacement battery block Brp and the non-replacement battery blocks B1 and B3, and between the replacement battery block Brp and the non-replacement battery blocks B12 and B14 may be great. Therefore, there is a possibility that the ECU 10 of the vehicle V will determine that the battery blocks B need to be replaced again at a relatively early timing after replacement of the battery blocks B.

Figure 8:
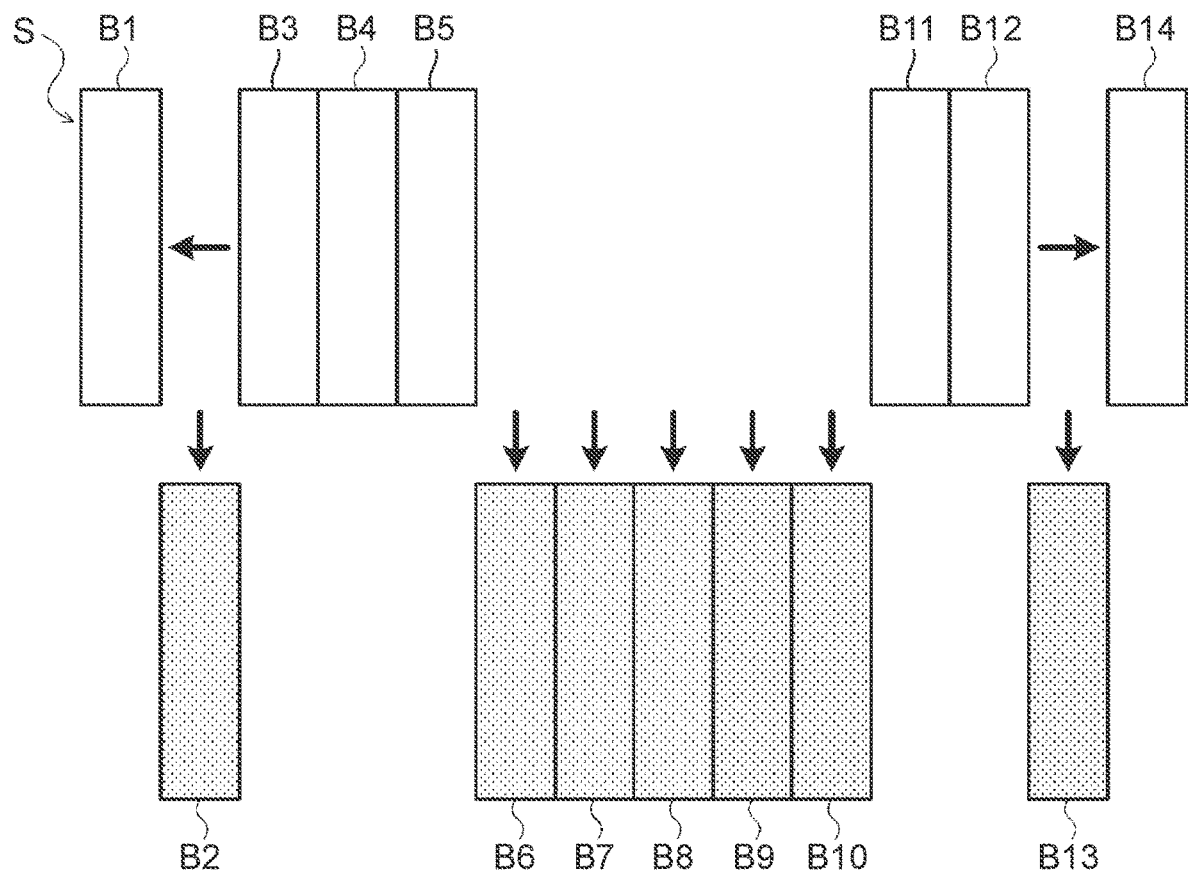
FIG. 8 is a schematic diagram for describing procedures for replacing battery blocks in the battery pack according to the present disclosure.

Taking this into consideration, when the battery blocks B2, B6 to B10, and B13 are identified as being the object of replacement as exemplarily illustrated in FIG. 5, the battery blocks B2 and so forth are replaced with the replacement battery blocks Brp as follows. That is to say, as illustrated in FIG. 8, when the battery blocks B2, B6 to B10, and B13 are removed from the battery pack 1, the non-replacement battery blocks B3 to B5, B11, and B12, other than the non-replacement battery blocks B1 and B14 located at one end or the other end of the battery stack S, are rearranged so as to be collected closer to the one end and the other end of the battery stack S in the stacking direction. More specifically, the non-replacement battery blocks B3 to B5 are moved to the non-replacement battery block B1 side (one end side) with the same array thereof maintained. Also, the non-replacement battery blocks B11 and B12 are moved to the non-replacement battery block B14 side (other end side) with the same array thereof maintained. Then, as illustrated in FIG. 9, multiple (seven) replacement battery blocks Brp are arrayed (assembled) between the multiple non-replacement battery blocks B1 and B3 to B5 on the one end side and the multiple non-replacement battery blocks B11, B12, and B14 on the other end side (the position at which the battery blocks B5 to B11 were placed before replacement).

As described above, in the battery pack 1, when some of the battery blocks B1 to B14 should be replaced, the some (multiple) of the battery blocks B are replaced with replacement battery blocks Brp that are refreshed in advance. That is to say, when battery blocks B in the battery pack 1 are replaced, the memory effect is not imparted to the replacement battery blocks Brp, and the work complication and increase in costs can be suppressed by omitting the process of imparting the memory effect.

Also, in the battery pack 1, when the battery blocks B that are the object of replacement are replaced with the replacement battery blocks Brp (after replacement), the multiple non-replacement battery blocks Bx in which the memory effect is occurring are appropriately rearranged to be adjacent to each other in the stacking direction of the battery blocks B, and the replacement battery blocks Brp with substantially no memory effect occurring are adjacent to each other in the stacking direction. Accordingly, multiple battery blocks B having a similar amount of voltage drop due to the memory effect are grouped together, and accordingly, a situation in which the voltage difference between two adjacent battery blocks $B_n$ and $B_{n+1}$ becomes great due to the voltage drop resulting from the memory effect when the SOC is low after the replacement of the battery blocks B can be satisfactorily suppressed, and whether the battery blocks B need to be replaced can be determined with good precision based on the voltage difference. As a result, in the battery pack 1, a situation in which the battery blocks B are erroneously determined to need to be replaced again at a relatively early timing after the replacement can be suppressed, while suppressing complication and increase in costs of replacement work of the battery blocks B.

Further, in the battery pack 1, when two or more of the battery blocks B are replaced with the replacement battery blocks Brp (after replacement), multiple non-replacement battery blocks Bx are adjacent to each other in the stacking direction at the one end side and the other end side of the battery stack S (multiple battery blocks B1 to B14) in the stacking direction, and multiple replacement battery blocks Brp are adjacent to each other in the stacking direction between the multiple non-replacement battery blocks Bx on the one end side and the multiple non-replacement battery blocks Bx on the other end side, as illustrated in FIG. 9. As a result, the factors causing the voltage difference to occur between the two adjacent non-replacement battery blocks Bx are substantially reduced to just the temperature difference between the two, thereby satisfactorily suppressing the voltage difference from becoming great, and also non-replacement battery blocks Bx and replacement battery blocks Brp are placed adjacently in a region where the temperature change is small (the range from the battery blocks B3 to B12 in the present embodiment) and the voltage difference between the two can be satisfactorily suppressed from becoming great. In addition, by placing the non-replacement battery blocks Bx on one end side and the other end side of the battery stack S where heat dissipation is high, the decline in the SOC of the non-replacement battery blocks Bx due to temperature rise can be suppressed, and the non-replacement battery blocks Bx can be protected.

Further, in the battery pack 1, when battery blocks B are replaced, the non-replacement battery blocks Bx are arrayed being collected closer to the one end and the other end of the battery stack S (battery blocks B1 to B14) in the stacking direction. Accordingly, when two or more of the battery blocks B are replaced with the replacement battery blocks Brp (after replacement), the non-replacement battery blocks Bx are placed at or near the positions of original placement, and accordingly, the voltage drop amounts of the non-replacement battery blocks Bx due to the memory effect can be made even closer to each other at each of the one end side and the other end side of the battery stack S.

Moreover, the vehicle V that is equipped with the battery pack 1 includes the motor generator MG that exchanges electric power with the battery pack 1, and the ECU 10 that issues a warning when the voltage difference $dV_n$ of two adjacent battery blocks $B_n$ and $B_{n+1}$ is not less than the threshold value dVref that is set in advance. Accordingly, the user of the vehicle V can be appropriately and promptly notified that some of the battery blocks B of the battery pack 1 should be replaced. Note however, that the battery pack 1 is not limited to being installed in the vehicle V, and may be installed in, for example, construction equipment, ships, or the like, or may be installed in fixed facilities other than moving bodies.

Further, in the above embodiment, the battery blocks B to be replaced with the replacement battery blocks Brp are the battery blocks B regarding which determination is made in the routine shown in FIG. 4 that the voltage difference $\Delta V_n$ between the maximum voltage $V_{max}$ of the battery blocks B1 to B14 and the voltage V of the battery blocks B is not less than the threshold value Vref that is set in advance. Thus, the battery blocks B that should be replaced can be decided more appropriately.

When executing the routine shown in FIG. 4, determination may be made that only a single battery block Bn should be replaced, and in such a case, there is a possibility that the voltage difference between the replacement battery block Brp replacing this battery block $B_n$ and adjacent battery blocks $B_{n-1}$ and $B_{n+1}$ will be great. Accordingly, when determination is made in the routine shown in FIG. 4 that only a single battery block $B_n$ should be replaced, at least one or both of the battery blocks $B_{n-1}$ and $B_{n+1}$ adjacent to the battery block $B_n$ may be selected as being the object of replacement. Further, when the number of non-replacement battery blocks Bx is smaller than the number of battery blocks B placed within the ranges at which the above temperature difference occurs at both end portions of the battery stack S (in the present embodiment, the positions of the battery blocks B1 to B3 and the positions of the battery blocks B12 to B14), which is six in the present embodiment for example, the user may be recommended to replace the entire battery pack 1 instead of replacing the battery blocks B.

Also, in the above embodiment, the battery blocks B and the replacement battery blocks Brp each include, but are not limited to, the battery cells that are nickel metal hydride secondary batteries. That is to say, the battery blocks B and the replacement battery blocks Brp may include battery cells that are other than nickel metal hydride secondary batteries and in which the memory effect occurs. Further, in the above embodiment, the battery blocks B are formed of two battery modules M, but is not limited thereto. That is to say, the battery blocks B may be formed of a single battery module M including a plurality of battery cells, or may be formed of a single battery cell.

It is needless to say that the present disclosure is not limited to the above-described embodiment, and that various modifications can be made within the extent of the scope of the present disclosure. Further, the above embodiment is merely a specific embodiment of the present disclosure described in the SUMMARY, and does not limit the components of the present disclosure described in the SUMMARY.

The present disclosure is applicable in the battery pack manufacturing industry and so forth.

What is claimed is:

1. A vehicle comprising:
   a battery pack comprising a plurality of battery blocks, the battery blocks being arrayed adjacent to each other in a stacking direction that is set in advance, multiple non-replacement battery blocks, which are batteries having a memory effect among the battery blocks, being adjacent to each other in the stacking direction, and replacement battery blocks, in which a memory effect is absent among the battery blocks, being adjacent to each other in the stacking direction
   an electric motor configured to exchange electric power with the battery pack; and
   an electronic control unit configured to, when a count of a voltage difference between two of the battery blocks adjacent to each other being not less than a first threshold value that is set in advance is not less than a second threshold value, store a block number of a battery block that has a lower voltage between the battery blocks adjacent to each other as a block number of a battery block to be replaced, and issue a warning.

2. The vehicle according to claim 1, wherein after two or more of the battery blocks are replaced with the replacement battery blocks, the non-replacement battery blocks are adjacent to each other in the stacking direction on both a first end portion side and a second end portion side in the stacking direction, and the replacement battery blocks are adjacent to each other in the stacking direction between the non-replacement battery blocks on the first end portion side and the non-replacement battery blocks on the second end portion side.

3. The vehicle according to claim 1, wherein among the non-replacement battery blocks, the non-replacement battery blocks that are closer to a first end portion than to a second end portion in the stacking direction are arrayed being collected to the first end portion, and the non-replacement battery blocks that are closer to the second end portion than to the first end portion are arrayed being collected to the second end portion.

4. The vehicle according to claim 1, wherein a voltage difference between a voltage of the battery block to be replaced and a maximum voltage among voltages of the battery blocks is not less than a replacement threshold value that is set in advance.

5. The vehicle according to claim 1, wherein each of the battery blocks includes a plurality of nickel metal hydride battery cells.

6. The vehicle according to claim 1, wherein the voltage difference between two of the battery blocks adjacent to each other is an absolute value of the voltage difference between two of the battery blocks adjacent to each other.

7. The vehicle according to claim 1, wherein the second threshold value is an integer 2 or greater.

* * * * *